US005669730A

United States Patent [19]

Bidaux

[11] Patent Number: 5,669,730

[45] Date of Patent: Sep. 23, 1997

[54] RELEASABLE COUPLING FOR A WORK TOOL TO A PERCUSSION APPARATUS

[76] Inventor: Marc Bidaux, 14 rue Ehlinger, 90400 Andelnans, France

[21] Appl. No.: 576,771

[22] Filed: Dec. 21, 1995

[30] Foreign Application Priority Data

Dec. 23, 1994 [FR] France .................................... 94 15732

[51] Int. Cl.[6] .......................................................... F16B 1/04

[52] U.S. Cl. .................... 403/325; 403/321; 403/DIG. 4; 285/316

[58] Field of Search ..................................... 403/321, 322, 403/325, 326, 327, 328, 316, 317, DIG. 4; 285/315, 316; 173/90, 92

[56] References Cited

U.S. PATENT DOCUMENTS

| | | | |
|---|---|---|---|
| 2,279,146 | 4/1942 | Schneller | 285/316 X |
| 2,458,088 | 1/1949 | Main | 285/316 |
| 2,461,699 | 2/1949 | Scheiwer | 403/316 X |
| 2,690,918 | 10/1954 | Holte | 403/321 X |
| 3,032,359 | 5/1962 | Cator | 285/316 X |
| 3,302,960 | 2/1967 | Herrmann | 403/325 |
| 3,666,300 | 5/1972 | Russell | 285/316 |
| 4,376,525 | 3/1983 | Frémy | 285/316 X |
| 5,141,355 | 8/1992 | Stillwagon | 403/322 X |
| 5,398,946 | 3/1995 | Quiring | 403/325 X |

FOREIGN PATENT DOCUMENTS

| | | | |
|---|---|---|---|
| 0427647 | 5/1991 | European Pat. Off. . | |
| 1115998 | 10/1961 | Germany | 403/325 |
| 3536132 | 4/1987 | Germany . | |
| 3930250 | 3/1991 | Germany . | |
| 2063991 | 6/1981 | United Kingdom | 403/322 |

*Primary Examiner*—Harry C. Kim

*Attorney, Agent, or Firm*—Ostrolenk, Faber, Gerb & Soffen, LLP

[57] ABSTRACT

A rapid releasable coupling for the tang of a work tool to a percussion apparatus. A tip of cylindrical shape extends the body of a percussion apparatus towards the front. Three longitudinal grooves are spaced an equal angle apart in the tip. A roller can move in each groove. Each roller has a pin with ends adapted to roll or slide on the edge of the groove. A ring threaded onto the tip and moveable longitudinally is returned rearward and against the rollers by a spring. The ring has section in the shape of a circular arc that partially surrounds the rollers. Displacement of the ring toward the front is by another ring which surrounds the assembly and which has an annular projection on its inner wall for holding the spring. A screw connection between the up and the other ring so that the other ring is moved longitudinally by being rotated.

8 Claims, 2 Drawing Sheets

RELEASABLE COUPLING FOR A WORK TOOL TO A PERCUSSION APPARATUS

BACKGROUND OF THE INVENTION

The object of the present invention is an anti-vibration rapid releasable coupling device for coupling the tang of a work tool to a percussion apparatus.

Percussion apparatus and particularly percussion hammers are used in numerous fields for descaling, recessing and cutting grooves in different materials.

These apparatus can generally comprise a body of cylindrical shape comprising at one of its ends a rapid locking and unlocking device for the tang of a work tool. The active portion of the tool differs depending on the type of application. Thus, in the case of a tool intended for peeling or scraping, the tang of the work tool generally has a cutout which permits it to be held in the percussion apparatus by means of stop members.

EP-A-90420482, in the name of the present applicant, describes a percussion apparatus having a body of general tubular shape comprising an end tip on which there is adapted a system for coupling the tang of a work tool associated with a shock absorber and having three stop balls which can be effaced by the sliding produced by an elastic return ring threaded on the end tip. An annular slide which is arranged within the top bears retractable stop balls which are partially introduced into the cutout made in the tang of the work tool. The latter balls place themselves in the holes left free by the effacing of the stop balls, permitting the axial sliding of the tang of the work tool and therefore its extraction.

However, the known devices have the drawback of jamming under the effect of the deformation of certain parts due to wear; thus, for instance, in the case of the device which has just be described, the stop balls, which always have a single point of contact with the rounded surface of the cutout of the tang of the work tool, can damage said surface during the backward and forward movements performed by the tool. Furthermore, the cost of manufacture of these known devices is relatively high due to the large number of parts forming them, requiring furthermore, for their cleaning or replacement, a removal and a lengthy and complicated remounting which requires special tools.

SUMMARY OF THE INVENTION

The object of the present invention is to overcome these drawbacks by providing a coupling device of greater reliability and simpler manufacture, and therefore of lower cost and easy and rapid maintenance, clearly improving the ease of use of the percussion apparatus.

The coupling device which forms the object of the present invention is characterized essentially by the fact that it comprises, on the one hand, a tip of cylindrical shape which extends the end of a body of percussion apparatus and in which there are provided three longitudinal grooves spaced at a uniform angle from each other around the tip in each groove there can move a roller having a pin the ends of which are adapted to roll or slide on the edges o said groove; furthermore, a ring threaded on said tip which can move longitudinally on the top is pulled backward against said rollers by a spring. The ring has a section in the shape of a circular arc partially around said rollers. The forward displacement of said ring is effected by a ring which surrounds the assembly and which ha an annular rib on its inner wall.

In accordance with a further feature of the invention, the rib has a vertical front face against which there comes to rest the rear face of the ring located above the arcuate portion thereof and an inclined rear face which assists in the disengagement of the rollers from said ring upon the unlocking phase.

In accordance with another feature of the invention, the ring which surrounds the assembly is provided, behind the annular rib, with a rib which is arranged on a portion of the inner circumference of said ring and a bored hole is formed radially to the rear of the grooves in the tip, into which hole there is introduced a blocking part the end of which protrudes from the tip and which comes against said rib.

The advantages and characteristics of the present invention will become more evident from the following description, read with reference to the accompanying drawing, it being understood that this description is in no way limitative of the invention.

DESCRIPTION OF A PREFERRED EMBODIMENT

Figure 1:
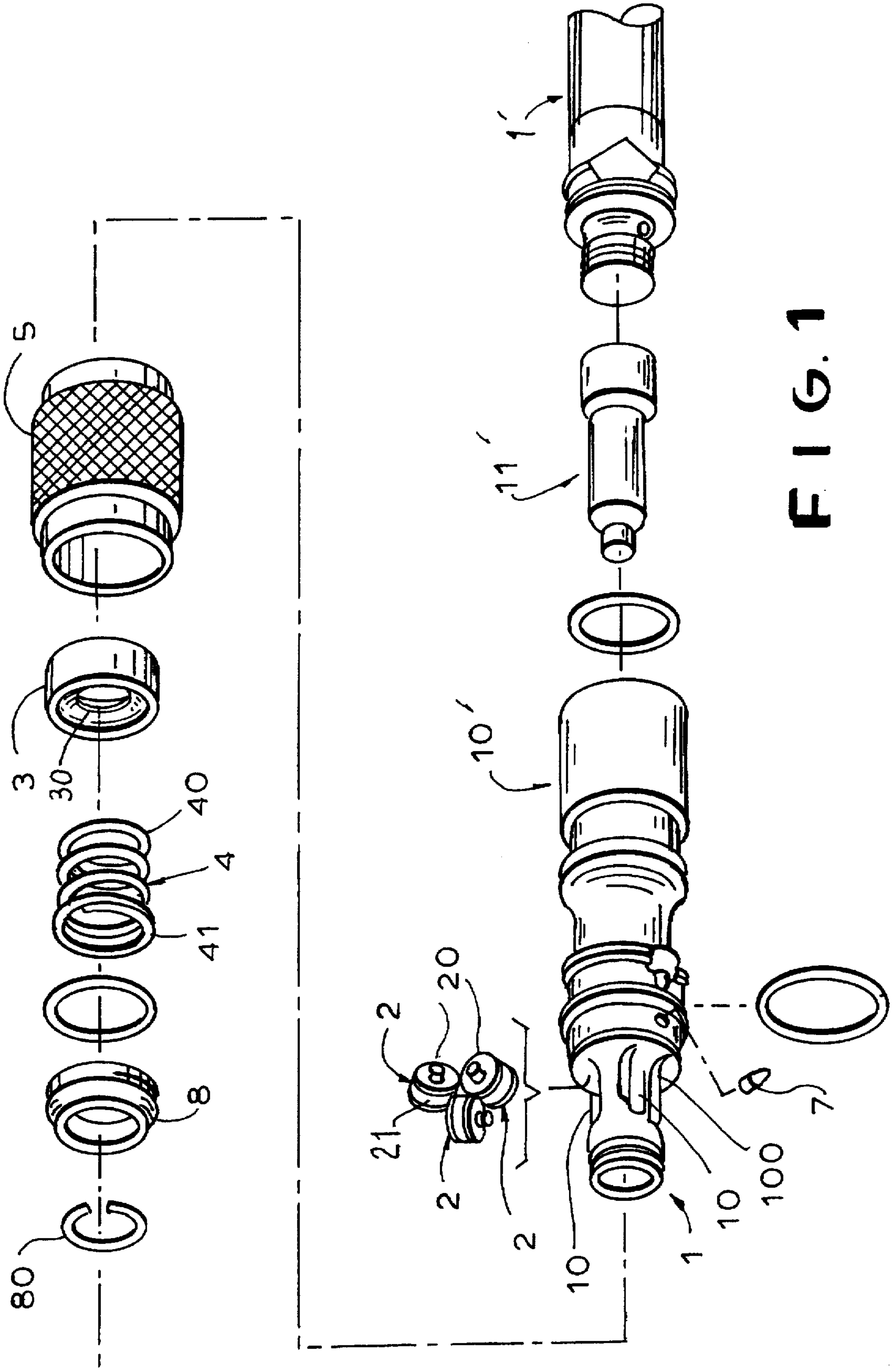
FIG. 1 is a perspective burst view of the coupling device of the invention mounted on a percussion apparatus.

Referring to FIG. 1, it can be seen that a coupling device in accordance with the invention comprises a tip 1 of generally cylindrical shape, which extends towards the front of the body 10' of a percussion apparatus 1' of known type, in which there are provided three longitudinal grooves 10 spaced at an angle of 120° C. apart, each having two shoulders 100 which are slightly recessed from the surface of the tip. In each of the grooves 10 a respective view of three rollers 2 can move. Each roller is provided with a pin 20 the ends of which rest on the two edges or shoulders 100 of the respective grooves 10. A cylindrical part 3, the cross section of which is circular arc 30, is installed in the direction toward the rear onto said tip, and is coaxially secured, towards the front, to the end 40 of a spring 4. The other end 41 of the spring is firmly attached to a ring 8 which comes in abutment against a stop ring 80 fastened to the front end of the tip 1 under the thrust of the spring 4, also exerting a push, towards the bottom of the grooves 10 on the cylindrical part 3 which surrounds the rollers 2 inserted partially into the arcuate portion 30 of the said cylindrical part 3. A locking ring 5 surrounds the assembly, permitting the displacement of the cylindrical part 3 towards the front.

It can also be seen that a weight 11' is engaged in known manner in a bore hole provided in the body 10'. The weight is intended to strike, due to the pressure of a fluid, against the tang of a work tool 6, coupled in the tip 1, as can be noted from FIG. 2. The tang of the tool is installed into the open bore hole at the center of the body 10'. The bore hole has two longitudinally spaced polygonal portions 60 and 61 which angularly immobilize the tang of the tool 6 within the tip 1. The tang is limited in translation over a course defined by the cutout 62 in the bottom of each groove 10. The rollers 2 extend through each cutout 62 to the tang within the body 10'. The rollers are partially covered by and because of its location outside the rollers, the rollers are urged inward by the arcuate portion 30 of the cylindrical part 3.

Each roller 2 may advantageously have a groove 21 which fits the contour of the surface of the tang 6 accessed through the cutout 62, avoiding, in the case of present devices which may employ balls, deformation of the surface of the tool upon its displacements forward and backward under the effect of the weight 11'.

Figure 2:
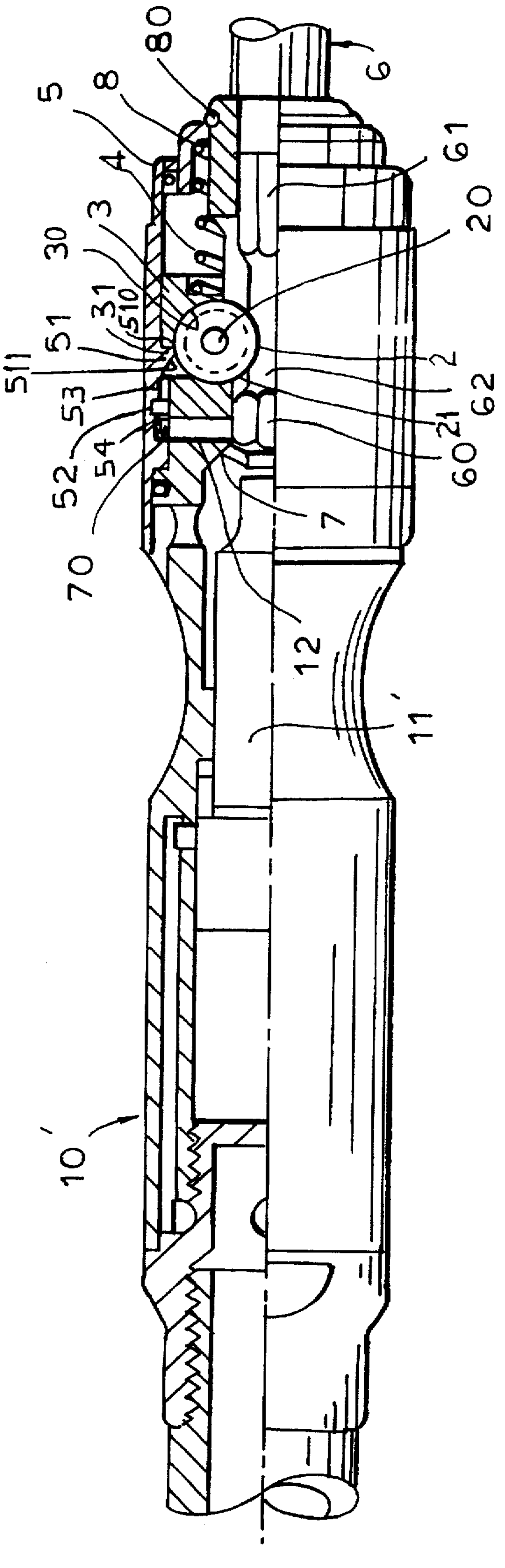
FIG. 2 is a sectional view of a device in accordance with the invention.

It can also be seen from FIG. 2 that the ring 5 is provided, on its inner wall, with an annular protrusion 51 having a vertical front face 510 against which abuts the vertical ring head 31 of the cylindrical part 3 which extends and terminates its arcuate part 30. The ring 5 also has an inclined rear face 511 which assists in the disengagement of the rollers from said cylindrical part 3 upon the unlocking.

The inner wall of the ring 5 also has, to the rear of the annular protrusion 51, a helicoidal rib 52 provided over its entire length with a groove 54 in which, when the ring 5 is turned in a given direction in order to advance it, there can slide the tit 70 of a tit screw 7 screwed into a tapped hole 12 in the tip and the screw 7 protruding from the tip 1.

The unlocking of the tang of the work tool inserted into the device in accordance with the invention is effected in the following manner. Rotation of the ring 5 by half a revolution, for instance, permits the sliding thereof in forward direction, via the tit 70 and the helicoidal groove 54, pushing the cylindrical part 3 against the spring 4. This releases the rollers 2 from the cutout 62 in the tang 6 of the work tool, which rollers move upward into the space 53 defined between the two ribs 51 and 52 of the ring 5. This permits extraction of the tang 6 of the tool of the percussion apparatus from the tip 1. Locking is effected by the reverse maneuver.

I claim:

1. A releasable rapid coupling for coupling a tang of a work tool to a tool assembly, the coupling comprising:

an apparatus having a front adapted to extend toward the tang of the tool, a generally cylindrically shaped tip of the apparatus extending toward the front of the apparatus and shaped for receiving the tang of the tool in the tip; at least one longitudinally extending groove in the tip;

at least one roller supported in the at least one groove for being movable forwardly and rearwardly longitudinally along the groove, and the groove being of a longitudinal length enabling such movement; the groove having an access cutout therein enabling the roller to engage the tang in the tip when the roller is in the groove;

a roller engaging first ring located around the tip and movable forwardly and rearwardly with respect to the tip, the first ring being engageable against the roller for preventing the roller from moving forward;

a spring supported to the tip and pressing the first ring rearwardly against the roller;

a second ring disposed around the first ring, the roller, and the groove, the second ring having an inward protrusion which engages the first ring for setting the position of the first ring against the roller as the first ring is urged rearward by the spring; wherein upon forward movement of the second ring with respect to the roller and along the first ring, the second ring being so shaped as to then free the roller to move out of the groove for releasing the tang to move free of the tip;

a screw connection between the second ring and the tip for causing rotation of the second ring around the tip in one direction to move the second ring forward for freeing the roller to move out of the groove, and for causing rotation of the second ring in the opposite direction for enabling the spring to urge the first ring against the roller to hold the roller in the groove.

2. The coupling of claim 1, wherein the screw connection between the second ring and the tip comprises a helicoidal rib and helicoidal groove arrangement on the interior of the second ring and a projection from the tip into the helicoidal groove in the second ring, so that rotation of the second ring moves the projection from the tip along the helicoidal groove and thereby causes the second ring to move selectively forward and rearward as the second ring is rotated around the tip.

3. The coupling of claim 1, wherein the at least one longitudinal groove comprises three longitudinal grooves spaced equal angle apart around the tip and the at least one roller comprises three rollers; whereby each of the grooves receives the respective roller therein.

4. The coupling of claim 3, wherein the first ring has the shape of generally a circular arc partially surrounding each of the rollers at a location around the roller to urge the roller into the respective groove.

5. The coupling of claim 3, wherein each of the rollers has a respective roller groove adapted to fit the contour of the surface of the tang, and each of the grooves in the tip having a respective cutout therein providing access for the roller to the tang through the cutout in the respective groove in the tip.

6. The coupling of claim 1, wherein the first ring has the shape generally of a circular arc partially surrounding the roller at a location around the roller to urge the roller into the respective groove.

7. The coupling of claim 1, wherein the roller has a respective pin having ends of a size and shape to roll or slide on the respective groove in which the roller and pin are disposed.

8. The coupling of claim 7, wherein the groove has respective edges for engaging the pins of the roller and the edges being recessed radially inwardly with respect to the surface of the tip.

* * * * *